United States Patent [19]
Regipa

[11] 3,779,443
[45] Dec. 18, 1973

[54] POSITIONING DEVICE FOR THE EDGE OF FLEXIBLE FILMS

[75] Inventor: Robert Regipa, Toulouse, France

[73] Assignee: Centre National D'Etudes Spatiales, Paris, France

[22] Filed: Apr. 6, 1972

[21] Appl. No.: 241,600

[30] Foreign Application Priority Data
Apr. 9, 1971 France .............................. 7112661

[52] U.S. Cl. ................................. 226/199, 271/59
[51] Int. Cl. ........................................ B65h 23/32
[58] Field of Search ....................... 226/15, 17, 196, 226/198, 199, 109; 271/52, 59, 49

[56] References Cited
UNITED STATES PATENTS

| | | | |
|---|---|---|---|
| 3,175,824 | 3/1965 | Albosta | 271/52 |
| 3,084,931 | 4/1963 | Hanson | 271/52 |
| 3,350,091 | 10/1967 | Masterson et al. | 271/52 |
| 3,550,741 | 12/1970 | Sherman | 271/52 |

Primary Examiner—Allen N. Knowles
Attorney—Roger Goudreau

[57] ABSTRACT

The disclosure herein describes a positioning device for at least one edge of a flexible film intended to travel continuously under the action of driving means in order to be subjected to a pre-determined operation. Two adjacent guiding elements include two oppositely facing surfaces spaced apart by a distance slightly greater than the thickness of the film; abutment means are provided with a positioning edge parallel to the direction of movement of the film. At least one pair of rollers are arranged symmetrically on each side of the guiding elements and are each provided with a flexible rolling skirt between which the film edge is elastically gripped; the plane of rotation of the skirts is slightly oblique with respect to the positioning edge so that the skirts of the rollers apply to the film forces directed towards the positioning edge, tending to apply the edge of the film against the positioning edge.

3 Claims, 3 Drawing Figures

3,779,443

POSITIONING DEVICE FOR THE EDGE OF FLEXIBLE FILMS

The present invention relates to a positioning device for at least one edge of a flexible film intended to move continuously under the action of driving means, for the purpose of being subjected to a definite operation. This device can be employed in all cases where it is necessary to give a film edge a perfectly defined position, or a natural state of tension without substantial elongation.

A device of this kind can find applications especially in the field of packings by means of synthetic film, in which field operations such as sealing the edges of the film, doubling these edges by reinforcing strips, assembly to another element, etc., are frequent. It may also be useful for the manufacture of ballons of synthetic material and especially balloons of a natural shape constituted by the assembly of a number of gores. In this latter case, the positioning device will make it possible to supply the assembly heads of the gores under correct conditions, or if so applicable, the edging systems intended to reinforce the edges of these gores by a strip in order to stiffen them.

The conventional positioning devices for edges of films are generally constituted by complex mechanical systems, especially comprising positioning rollers mounted on elastic means and which hold the film by effecting a pressure on it.

These systems have two essential disadvantages, one, resulting from their complexity, being related to their production cost, their overall dimensions and also their fragility, while the other arises from the fact that, in order to avoid accidental release of the film, it is necessary to apply the above-mentioned rollers against the film with a relatively-high pressure. This pressure necessitates an increase in the power necessary for driving the film and causes considerable risk of elongations of the film which are prejudicial to the quality and to the uniformity of the operation to which the film is subjected. This latter drawback is especially serious for films having a high modulus of elasticity.

A first object of the present invention is to provide a positioning device having a simple structure, having no moving part mounted on an elastic spring, and having advantageously a low production cost and excellent strength.

A further object of the invention is to reduce simultaneously the pressures normally applied to the film and the risk of lateral engagement of the film.

To this end, according to the invention, a positioning device for the edge of a film comprises, for each film edge to be positioned, two adjacent guiding elements comprising two oppositely-facing guiding surfaces spaced apart by a distance slightly greater than the thickness of the film, and between which the edge of the film is intended to be moved; abutment means provided with a positioning edge parallel to the direction of movement of the film and against which the edge of the film, guided by the above-mentioned surfaces is intended to be applied and to slide; at least one pair of rollers, arranged symmetrically on each side of the guiding elements and provided with flexible rolling skirts, between which the edge of the film can be elastically gripped, the plane of rotation of the rollers being slightly oblique wite respect to the above-mentioned positioning edge, in such manner that the skirts of the rollers apply on the film during its passage, forces directed towards this positioning edge and tending to apply the edge of the film against this latter.

The guiding elements which may be simple plates facing each other, define the position of the plane in which the film will be located, eliminate possible folds which may be formed on the edges of this film, and prevent the latter from becoming corrugated over the entire zone in which it is guided by these elements. In other words, these elements give the film an artificial rigidity in this zone.

Furthermore, by reason of the obliquity of their plane of rotation, the rollers with flexible skirts apply a slight pressure on the film and thus ensure a constant application of the edge of the film against the positioning edge which defines the position of the film edge in the plane of the film.

In accordance with a preferred form of embodiment, the flexible skirt of each roller has a conical shape flared towards the above-mentioned positioning edge. Thus, by reason of this conicity, the generator lines of the skirt terminate at each instant on the film and have a certain obliquity with regard to a perpendicular to the plane of the film. In case of accidental movement of the edge of the film in a direction opposite to the positioning edge, the conical skirt of the roller acts by a gripping effect caused by its deformation, to apply a pressure greater than that which it normally applies, this pressure acting in opposition to any increase in the retraction of the film, and which continues to be applied until the cause of the retraction has disappeared.

In addition, even before this disappearance, the edge of the film again takes-up its correct position in contact with the positioning edge, by reason of the obliquity of the planes of rotation of the rollers, which, as has already been stated, have a tendency to push back the film towards the positioning edge.

A device of this kind thus applies, in normal operation, very small pressures on the film, but has the faculty of automatically generating much larger transverse pressures in the case where these become necessary in order to retain the film effectively.

For the purpose of increasing its effectiveness, the flexible skirt on each roller may advantageously be constituted by an assembly of conical washers of elastic material, mounted close to each other. This arrangement increases the faculty of deformation of the said skirt, and in the case of retraction of the film, reinforces the gripping effect.

Furthermore, these rollers may be arranged so as to face windows formed in the guiding elements of the film. The flexible rolling skirts thus come into contact with the film through the windows in the actual centre of the guided and consequently stiffened surface of the film.

In accordance with a particular form of embodiment intended to ensure the positioning of two films edge to edge, especially with a view to their assembly, the two guiding surfaces associated with one film are respectively co-planar with the guiding surfaces associated with the other film, while the positioning edges associated with both films are respectively constituted by the two faces of a fine blade fixed on the one hand between the guiding elements of one film and on the other hand between those of the other film.

In other words, the means which position each film are identical and are arranged symmetrically with respect to the above-mentioned blade, the two faces of which, very close together due to the small thickness of the blade, effect a positioning of the films substantially edge to edge. This device has an important practical advantage, since it very frequently becomes necessary to arrange the edges of films one against the other in the same plane, most frequently for the purpose of assembling them together, especially by means of a coupling strip.

The device according to the invention may be mounted in a fixed position immediately upstream of the members which subject the film to the operation for which it is brought into position. This device may also be supported by an arm coupled to the frame through the intermediary of articulation means which give it the faculty of moving in all directions in a predetermined space. In this case, it thus makes it possible to effect a preliminary positioning of the film which, if so desired, will precede a more precise positioning carried out by fixed positioning means. This assembly is especially advantageous when the film to be positioned is presented in disorder or in bulk.

In addition, especially in this latter case, it may be useful to associate with the device an auxiliary traction system for the film, controlled by the main driving means of the film.

The description which follows below relating to forms of embodiment of the invention given by way of non-limitative examples with reference to the accompanying drawings, will facilitate a clearer understanding of the invention. In these drawings.

Figure 1:
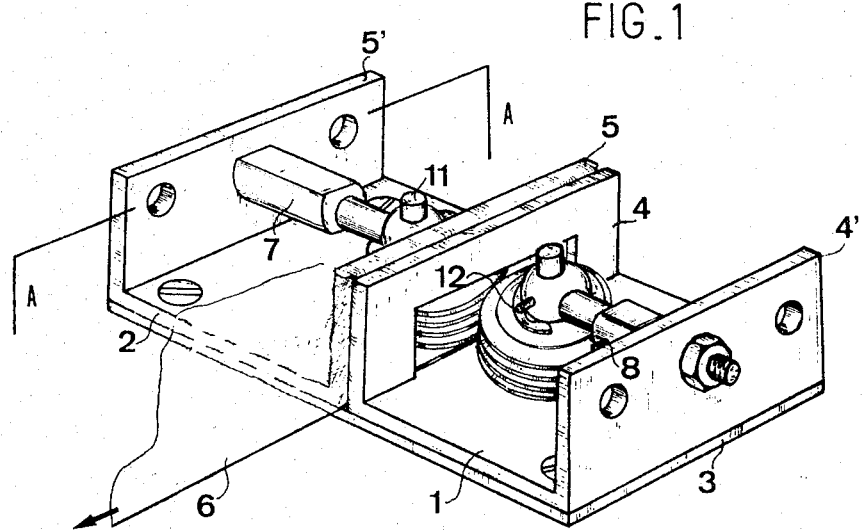
FIG. 1 is a perspective view of a positioning device according to the invention.
Figure 2:
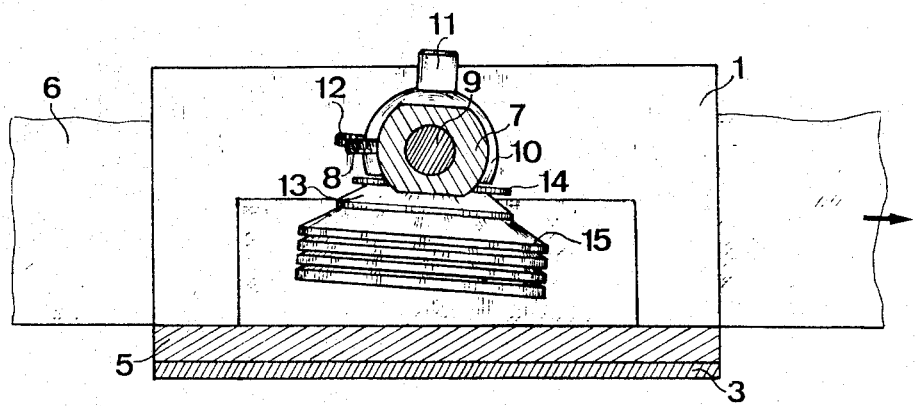
FIG. 2 is a cross-section of this device taken along the line A—A of FIG. 1.

A positioning device as shown in FIGS. 1 and 2 comprises two plates 1 and 2 of U-shape, coupled together by a plate 3, so that their facing wings 4 and 5 are separated by a distance slightly greater than the thickness of films to be positioned, such as the one shown at 6. In the example described, the film to be positioned is a polyethylene film of a few multiples of 10 microns in thickness, and the wings 4 and 5 are spaced apart by a few tenths of a millimetre.

On the other wing (4' or 5') of each of the plates 1 and 2 is fixed a roller support such as 7, inside the cylindrical core of which there may be fixed, by means of a pressure screw 8, an arm 9. This latter comprises at its extremity a protuberance 10 hollowed out so as to house a roller shaft 11 which can be fixed by means of a pressure screw 12. On this shaft are mounted, between rigid conical rings 13 axially stabilized by clips 14, a number of conical washers 15 of flexible material which constitute each roller. In the example shown, a roller is constituted by four flexible washers.

The position of each roller is adjustable by means of the screws 8 and 12 and these rollers may be mounted facing each other through windows formed in the wings 4 and 5. The pressure screw 8 permits adjustment of the distance which separates the rollers from each other and in consequence enables the pressure to be regulated, with which the flexible washers of the rollers will grip the film 6 through the windows of the wings 4 and 5.

This same pressure screw 8 also provides the faculty of orientating the direction of the axis of rotation of each roller. This axis will be given an oblique direction with respect to a perpendicular to the plate 3, so that the rotation of the flexible washers 15 is effected in oblique planes with respect to the plate 3 (FIG. 2). These planes of rotation are slightly convergent towards this plate 3 with respect to the direction of travel of the film, so that the washers 15 of the rollers have a tendency to apply the film against the portion of the plate 3 which is located between the guiding wings 4 and 5.

Furthermore, the pressure screws 12 provide a regulation for the distance which separates each roller from the edge of the film.

The utilization of a device of this kind is readily understood. Prior to starting-up, the position and the orientation of the rollers (which may differ according to the nature and the thickness of the film) are regulated by means of tests. Under the action of traction driving means, the film edge travels between the guiding wings 4 and 5 and, under the effect of the flexible washers 15 which grip it and draw it towards the plate 3, is applied against this plate. When so required, under the influence of an accidental lateral force tending to separate the film edge from this plate, the washers become deformed due to their conicity and effect an elastic grip on the film, on which they apply a pressure which increases with the value of the accidental force applied to the film.

In addition to the advantage deriving from its simplicity, the advantage of such a device resides in the very low value of the pressure which it applies on the film in normal operation. This particular feature makes it possible for the device to be applied to films having a high modulus of elasticity, without causing variations in length of the latter of any substantial extent.

Figure 3:
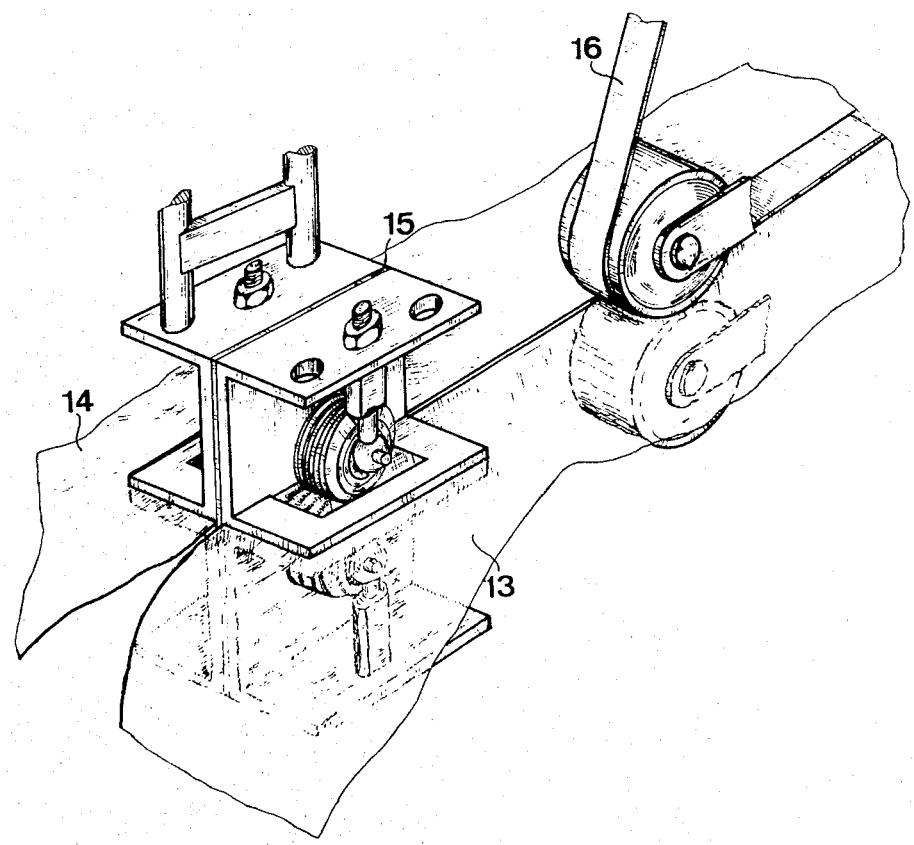
FIG. 3 is a perspective view of a device intended to position two films edge to edge for the purpose of their assembly.

There has been shown in FIG. 3 a device capable of positioning the edges of two films 13 and 14. This device is constituted by two devices such as previously described fixed to each other and separated by a thin plate 15 which replaces the plate 3. It can be seen from this figure that a device of this kind is capable of positioning the films 13 and 14, edge to edge, for example for the purpose of their assembly by thermo-adhesion of a strip 16 which overlaps both the edges thus positioned.

Although the invention has been described above in relation to specific forms thereof, it will be evident to persons skilled in the art that it may be refined and modified in various ways. It is therefore wished to have it understood that the present invention is not limited in interpretation except by the scope of the following claims.

I claim:

1. A positioning device for at least one edge of a flexible film intended to travel continuously under the action of driving means in order to be subjected to a predetermined operation, comprising: two adjacent guiding elements including oppositely-facing surfaces spaced apart by a distance slightly greater than the thickness of said film, the edge of said film being movable between said surfaces; abutment means provided with a positioning edge parallel to the direction of movement of the film, the edge of said film, guided by said surfaces, being applied and slidable against said positioning edge; and at least one pair of rollers arranged symmetrically on each side of said guiding elements and each provided with a flexible rolling skirt between which the film edge is elastically gripped, the plane of rotation of said roller being slightly oblique with respect to said positioning edge, so that the skirt of said rollers apply to the film, during its passage, forces directed towards said positioning edge tending to apply the edge of the film against said positioning edge; said positioning device being further intended to ensure the positioning of two films edge to edge, characterized in that the two guiding surfaces associated with one film are respectively co-planar with the guiding surfaces associated with the other film, the positioning edges associated with the two films being respectively constituted by two faces of a thin plate fixed between the guiding elements of one film and the guiding elements of the other film.

2. A positioning device in accordance with claim 1, characterized in that the device is supported by an arm coupled to a frame through the intermediary of articulation means which enable it to move in all directions within a pre-determined space.

3. A positioning device in accordance with claim 2, characterized in that it comprises an auxiliary traction system for said film, said traction system being controlled in dependence on the main driving means of said film.

* * * * *